United States Patent
Naidu et al.

(10) Patent No.: US 9,121,957 B2
(45) Date of Patent: Sep. 1, 2015

(54) RADIATION MODULATION IN A SECURITY EXAMINATION APPARATUS

(75) Inventors: Ram C. Naidu, Newton, MA (US); Chitra Subramanian, Salem, MA (US); Sergey B. Simanovsky, Brookline, MA (US); Zhengrong Ying, Belmont, MA (US); Dong-Yueh Liang, Sudbury, MA (US); Douglas Q. Abraham, Topsfield, MA (US)

(73) Assignee: Analogic Corporation, Peabody, MA (US)

( * ) Notice: Subject to any disclaimer, the term of this patent is extended or adjusted under 35 U.S.C. 154(b) by 375 days.

(21) Appl. No.: 13/123,833

(22) PCT Filed: Oct. 14, 2008

(86) PCT No.: PCT/US2008/079830
§ 371 (c)(1),
(2), (4) Date: Apr. 12, 2011

(87) PCT Pub. No.: WO2010/044774
PCT Pub. Date: Apr. 22, 2010

(65) Prior Publication Data
US 2011/0200167 A1    Aug. 18, 2011

(51) Int. Cl.
*G01V 5/00* (2006.01)

(52) U.S. Cl.
CPC ............ *G01V 5/0041* (2013.01); *G01V 5/0016* (2013.01); *G01V 5/005* (2013.01)

(58) Field of Classification Search
CPC ...... A61B 6/032; A61B 6/035; A61B 6/4266; G01V 5/0041; G01V 5/005

USPC ........................... 378/16, 19, 57, 20
See application file for complete search history.

(56) References Cited

U.S. PATENT DOCUMENTS

| 4,220,863 | A | * | 9/1980 | McBride et al. | ................. | 378/19 |
| 5,228,070 | A | | 7/1993 | Mattson | | |
| 6,256,404 | B1 | | 7/2001 | Gordon et al. | | |
| 6,687,326 | B1 | * | 2/2004 | Bechwati et al. | ................. | 378/7 |

(Continued)

FOREIGN PATENT DOCUMENTS

| EP | 2078957 A1 | 7/2009 |
| WO | 2006/024690 A1 | 3/2006 |
| WO | 2007/039876 A2 | 4/2007 |

OTHER PUBLICATIONS

International Search Report cited in related application No. PCT/US2008/079830 dated Feb. 5, 2010.

(Continued)

*Primary Examiner* — Glen Kao
(74) *Attorney, Agent, or Firm* — Cooper Legal Group LLC

(57) ABSTRACT

Radiation flux can be adjusted "on the fly" as an object (204) is being scanned in a security examination apparatus. Adjustments are made to the radiation flux based upon radiation incident on a first radiation detector (226) in an upstream portion (233) of an examination region. The object under examination is thus exposed to different radiation flux in coordination with a downstream motion (235) of the object relative to a second radiation detector (228). The radiation flux is adjusted so that a sufficient number of x-rays (that traverse the object) are incident on the second radiation detector. Images of the object can then be generated based upon data from the second radiation detector, where these images are thus of a desired/higher quality.

20 Claims, 5 Drawing Sheets

(56) References Cited

U.S. PATENT DOCUMENTS

| | | | |
|---|---|---|---|
| 2004/0258199 A1 | 12/2004 | Ellenbogen et al. | |
| 2007/0223649 A1* | 9/2007 | De Godzinsky | 378/4 |
| 2007/0230657 A1* | 10/2007 | Garms | 378/57 |
| 2008/0253509 A1* | 10/2008 | Schlomka et al. | 378/19 |
| 2009/0161817 A1* | 6/2009 | Schlomka | 378/14 |

OTHER PUBLICATIONS

"Dose reduction in CT by anatomically adapted tube current modulation, I. Simulation studies", Michael Gies, Willi A. Kalender, Heiko Wolf, Christoph Suess and Mark T. Madsen, American Association of Physicists in Medicine, 26 (11), Nov. 1999, 14 pgs.

"Dose reduction in CT by anatomically adapted tube current modulation, II. Phantom measurements", Willi A. Kalender, Heiko Wolf and Christoph Suess, American Association of Physicists in Medicine, 26 (11), Nov. 1999, 6 pgs.

Updated International Search Report cited in related application No. PCT/US2008/079830 dated Apr. 26, 2011.

EP Communication cited in EP Application No. 08876412.1 dated Jun. 12, 2012, 7 pgs.

EP Communication cited in EP Application No. 08876412.1 dated Oct. 6, 2014, 6 pgs.

EP Communication cited in EP Application No. 08876412.1 dated Mar. 10, 2015, 7 pgs.

* cited by examiner

RADIATION MODULATION IN A SECURITY EXAMINATION APPARATUS

BACKGROUND

The present application applies to radiation flux in Computed Tomography (CT) equipment. While it applies to a variety of computed tomography equipment, it finds particular application to security examination equipment, such as baggage systems commonly found in airports and government buildings.

Computed Tomography, in general, generates a three-dimensional image of an object from a series of two-dimensional images taken around a single axis of rotation. An object under examination is exposed to radiation, and images are formed based on the radiation absorbed by the object, or rather an amount of radiation that is able to pass through the object. Highly dense objects absorb more radiation than less dense objects, and thus an object having a high density, such as a metal gun, for example, will be apparent when surrounded by less dense objects, such as clothing.

In baggage systems, Computed Tomography equipment is used to detect weapons, explosives, and other prohibited items that may be contained in a suitcase or bag being scanned. One type of CT baggage scanner is described in U.S. Pat. No. 6,256,404 to Gordon et al. In particular, an x-ray tube and a detector array are mounted on diametrically opposing sides of an annular shaped rotating platform, or disk, disposed within a gantry support for rotation about a single axis that is parallel to the direction of travel of the baggage (e.g., along a conveyor system). The x-ray tube emits x-rays at a fixed radiation flux rate, and the x-rays traverse the baggage under examination. X-rays that are not absorbed by the baggage and/or objects therein are detected by a detector, and an image of the bag and the contents thereof may be created based on the detected x-rays.

While such a configuration has proven effective in detecting objects, there remains room for improvement. For example, the x-ray tube emits x-rays at a fixed rate, regardless of the object being scanned. If a dense bag, such as a laptop bag, is scanned, a large percentage of the emitted x-rays may be absorbed by the bag, causing a small percentage of the emitted x-rays to be detected by a detector, and an image of bag to be created wherein the contents are rendered indistinguishable. Additionally, x-rays are emitted during instances in which there are no objects being scanned, which may reduce the life of the x-ray tube unnecessarily.

SUMMARY

Aspects of the present application address the above matters, and others. According to one aspect of the present application, a security examination apparatus comprises an examination region including an upstream portion and a downstream portion for performing a security examination of an object, wherein the object is received in the examination region at the upstream portion. The apparatus also comprises an x-ray source, a first detector configured to detect x-rays that have traversed the object in the upstream portion, and a second x-ray detector configured to detect second x-rays emitted from the x-ray source that have traversed the object in the downstream portion, wherein the second x-ray detector is located downstream from the first detector. The apparatus also comprises a controller configured to adjust an x-ray flux emitted by the x-ray source as a function of the x-rays detected by the first detector and in coordination with a downstream motion of the object relative to the second detector.

According to another aspect, a method for adjusting x-ray flux output by an x-ray source in a security scanning apparatus is provided. The method comprises detecting x-rays incident on a first detector that have traversed an object under examination, the object received in an upstream portion of an examination region. The method also comprises adjusting an x-ray flux emitted by an x-ray source as a function of the x-rays detected by the first detector and in coordination with a downstream motion of the object relative to a second detector, where the second detector is located in a downstream portion of the examination region and is configured to detect second x-rays emitted from the x-ray source that have traversed the object.

According to another aspect, a computer usable medium comprising computer readable programming configured to adjust radiation flux output by a radiation source in a security scanning apparatus is provided. The computer usable medium, when executed on a computing device, causes the computing device to predict a radiation flux that will cause a predetermined amount of second radiation to traverse an object and be detected by a second radiation detector in a downstream portion of an examination region as a function of data received from a first radiation detector in an upstream portion of the examination region that detects radiation that has traversed the object. The computer usable medium also causes that computing device to adjust the radiation flux output by the radiation source as a function of the prediction while the object is moving from the upstream portion of the examination region to the downstream portion of the examination region.

Those of ordinary skill in the art will appreciate still other aspects of the present application upon reading and understanding the appended description.

DESCRIPTION OF THE DRAWINGS

The application is illustrated by way of example and not limitation in the figures of the accompanying drawings, in which like references generally indicate like features, and in which.

DESCRIPTION

Figure 1:
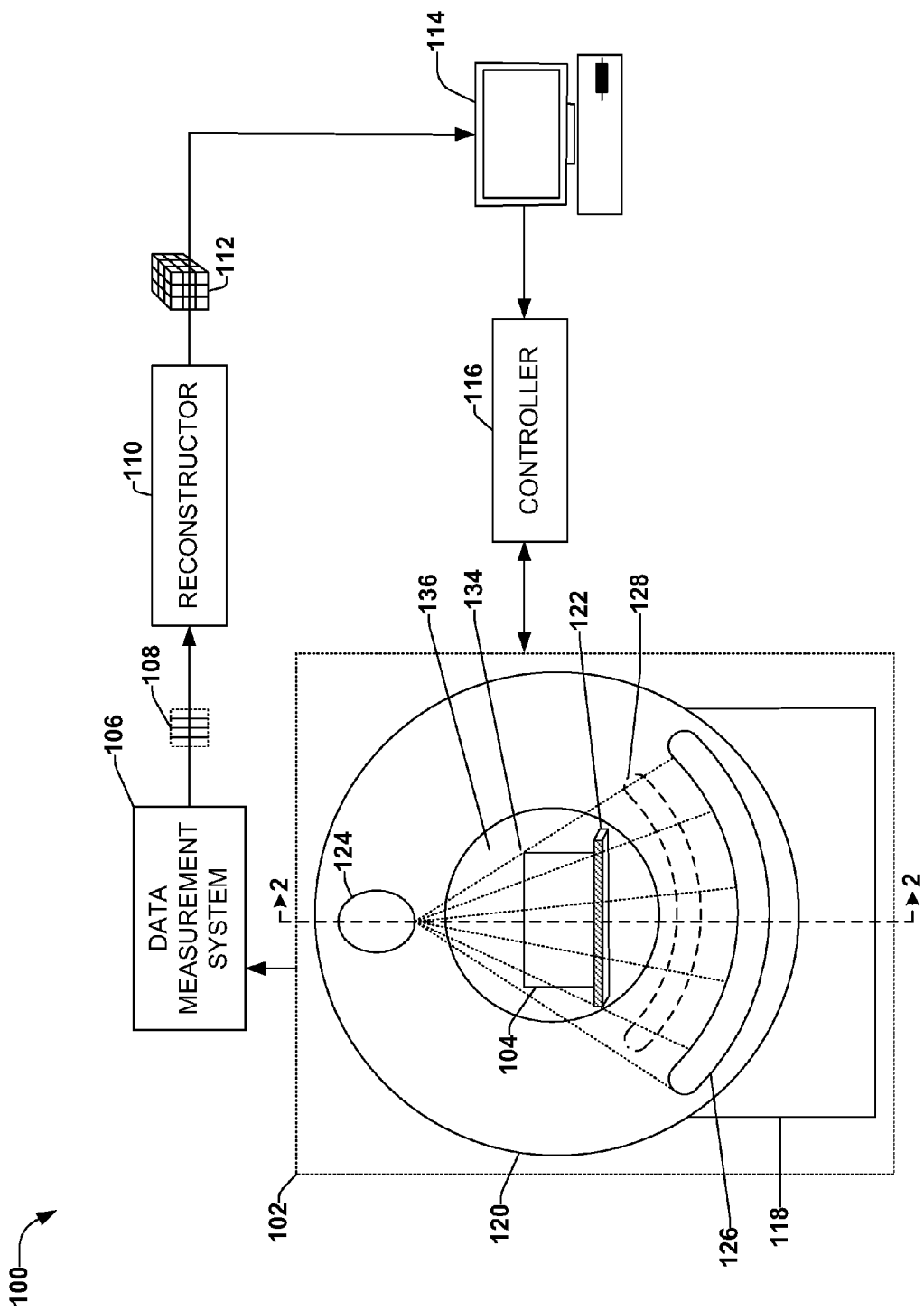
FIG. 1 depicts a security examination apparatus wherein radiation flux may be adjusted as provided herein.

FIG. 1 depicts a security examination apparatus 100 (e.g., used to scan luggage at an airport, government buildings, etc.). As illustrated, the apparatus 100 typically comprises an object scanning apparatus 102 configured to scan an object 104 (e.g., a suitcase), a data measurement system 106 configured to collect information and data from the object scanning apparatus 102, and a reconstructor 110 configured to receive projection space data 108 from the data measurement system 106 and generate image space data 112 indicative of the scanned object 104. The apparatus also typically comprises a monitor 114 (e.g., desktop or laptop computer) configured to display the image space data 112 for human observation, and a controller 116 configured provide commands to the object scanning apparatus 102 as a function of human input (e.g., via a consol associated with the monitor 114) and/or feedback from the object scanning apparatus 102.

The object scanning apparatus 102 may be a third generation computed tomography (CT) scanner that comprises a stationary gantry 118, a rotating gantry 120 and a conveyor 122. The rotating gantry 120 is configured to rotate relative to the stationary gantry 118 about an axis of rotation perpendicular to the plane of the page (e.g., into/out of the page). Similarly, the conveyor 122 is configured to convey the object 104 parallel to the axis of rotation from an upstream portion of an examination region 134 to a downstream portion of the examination region 134 (e.g., further into the page). It will be understood that the stationary gantry 118 need not be perfectly stationary and may, for example, be configured to translate along the axis of rotation. In the illustrated implementation, the rotating gantry 120 defines a generally cylindrical bore 136 having a diameter sized to receive an object to be examined (e.g., baggage). The examination region 134 is generally comprised within the cylindrical bore 136, and in an airport environment, for example, the bore 136 may have an inner diameter of roughly 2 feet, although other sizes and configurations are contemplated. It will be appreciated, however, that other types of scanners are also be contemplated. For example, the techniques disclosed herein may be implemented in a "line scanner," a fourth generation CT scanner, etc.

The rotating gantry 120 comprises a radiation source 124 (e.g., an x-ray tube), a first radiation detector 126 (e.g., an auxiliary x-ray detector) and a second radiation detector 128 (e.g., an array of main x-ray detectors). It will be appreciated that the second radiation detector 128 is illustrated in phantom in FIG. 1 to indicate that it is downstream of the first radiation detector 126 (e.g., further into the page). A reference channel is positioned to measure the flux emitted by the source unobstructed. That is, this reference channel component measures the flux before it passes through the object under examination. In security applications, the radiation source 124 may generate a fan, cone, wedge, or other shaped beam of radiation that traverses the object 104. The rotating gantry 120, the radiation source 124, and radiation detectors 126 and 128 rotate about the object 104. In this way, projections from a variety of perspectives of a suitcase, for example, can be collected, from a single scan of the object to create a set of projections for the object. It will be appreciated that in another embodiment, the rotating gantry 120 is stationary and the object 104 is rotated.

Images of content (e.g., clothing, weapons, etc.) within the object 104 being scanned (e.g., the suitcase) are created based on radiation detected by the second radiation detector 128. Content with a higher density and/or a higher atomic number (relative to densities and atomic numbers of other content), for example, may appear more or less prominently (depending upon contrast settings) with respect to other content within the object 104 being scanned because less radiation is able to pass through the content having a higher density (causing the second radiation detector 128 to detect less radiation in that region). For example, if a suitcase, filled with clothes and a metal gun, passes through the object scanning apparatus 102, the gun may appear more prominently than the clothes (which may be virtually invisible), since the clothes are less dense than the gun.

The quality of an image generated by a CT scanner is attributable in large part to the radiation detected by the second radiation detector 128. Conventionally, a relatively large amount of radiation is emitted from a radiation source 124 at a constant rate so that an image of sufficient contrast can be obtained regardless of the density of the object(s) under examination. It can be appreciated that this is an inefficient process, at least, because one or more of the objects under examination may not be very dense, and thus a smaller dose of radiation may be more appropriate to generate a desirable image/level of contrast. This can result in a prematurely reduced lifespan of the x-ray source and/or "washed out" images, for example. Additionally, when the objects under examination are dense, increasing the radiation flux may be required to generate a desirable image/ level of contrast.

As provided herein, the x-ray flux emitted by the x-ray source 124 may be adjusted (e.g., via the controller 116) as a function of the x-rays detected by the (upstream) first detector 126 and in coordination with a downstream motion of the object 104 relative to the second detector 128. As a result of the first radiation detector 126 being upstream of the second radiation detector 128, the object being scanned may effectively be previewed, and the radiation flux (e.g., the rate at which radiation is emitted by the radiation source 124) may be adjusted before the second radiation detector 128 detects radiation that has traversed the object 104. There are several benefits to adjusting the radiation emitted as a function of the object being scanned (as compared to applying a fixed amount of radiation to a plurality of objects). For example, reducing the radiation flux, particularly when objects are not being scanned, saves energy and reduces wear on the radiation source 224 (e.g., increasing its life and reducing operating and maintenance costs). Additionally, increasing the radiation flux (as necessary to achieve the desired output for some objects) allows objects to be scanned that would otherwise produce indistinguishable images when scanned with a relatively low and constant x-ray flux.

In the example apparatus 100, the data measurement system 106 is operably coupled to the object scanning apparatus 102, and is configured to collect information and data from the second radiation detector 128. As provided herein, the data measurement system 106 may also be configured to collect information and data from the first radiation detector 126. The data measurement system 106 may also be used to compile the collected data into projection space data 108 for the object 104. As an example, x-ray projections may be acquired at a plurality of angular positions (as the rotating gantry 120 rotates) with respect to the object 104.

In the example apparatus 100, the reconstructor 110 is operably coupled to the data measurement system 106, and is configured to receive the projection space data 108 from the data measurement system 106 and generate image space data 112 indicative of the scanned object 104 using a suitable analytical, iterative, and/or other reconstruction technique (e.g., backprojection from projection space to image space).

In one embodiment, the image space data 112 for a suitcase, for example, may ultimately be displayed on the monitor 114 for human observation. In this embodiment, an operator may isolate and manipulate the image, for example, rotating and viewing the suitcase from a variety of angles, zoom levels, and positions.

Figure 2:
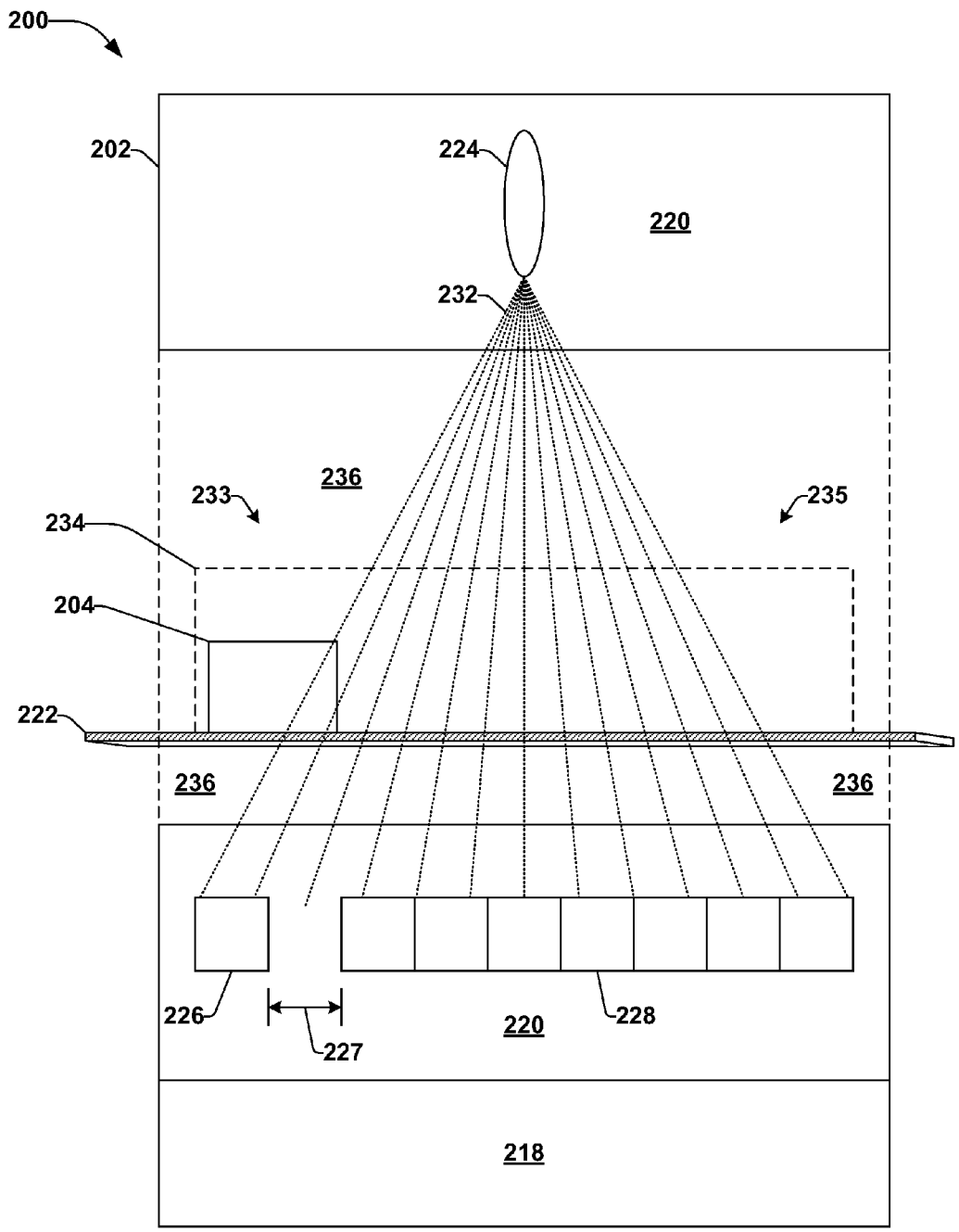
FIG. 2 is a cross sectional view illustrating an object scanning apparatus.

FIG. 2 is a cross sectional area (e.g., taken along line 2-2 in FIG. 1) of an example object scanning apparatus 202 (e.g., 102 in FIG. 1). The object scanning apparatus 202 comprises a stationary gantry 218 (e.g., 118 in FIG. 1), a rotating gantry 220 (e.g., 120 in FIG. 1) configured to rotate relative to the stationary gantry 218, and a conveyor 222 (e.g., 122 in FIG. 1)

configured to transport an object 204 (e.g., 104 in FIG. 1) from an upstream portion 233 of an examination region 234 to a downstream portion 235 of the examination region 234 (e.g., from left to right in FIG. 2), where the examination region 234 is generally comprised within a substantially cylindrical bore 236 through the apparatus 202.

The rotating gantry 220 comprises a radiation source 224 (e.g., 124 in FIG. 1), a collimator (not shown) configured to shape radiation 232 produced by the radiation source 224 into a desired shape (e.g., a fan, cone, etc.), a first radiation detector 226 (e.g., 126 in FIG. 1), and a second radiation detector 228 (e.g., 128 in FIG. 1). While example 200 illustrates a space 227 between the first radiation detector 226 and the second radiation detector 228, it will be appreciated that other configurations of the first radiation detector 226 and the second radiation detector 228 are contemplated. For example, the first radiation detector 226 may be the first radiation detector 226 on a plurality of contiguous detectors, wherein the remaining detectors are the second radiation detector 228 (e.g., there is no space between the first radiation detector 226 and the second radiation detector 228). It will be appreciated that a space may be desired, for example, as a function of a controller's processing speed (e.g., for processing data from the first detector 226) and/or the rate at which the radiation source may be adjusted (e.g., how long it may take x-ray flux emitted from the x-ray source 224 to be adjusted).

In operation, the object to be examined 204 (e.g., a suitcase) may be placed on the conveyor 222 (a belt system, roller system, etc) so as to be received at the upstream portion 233 of the examination region 234 and conveyed from left to right to the downstream portion 235 of the examination region 234. While the object 204 is in the examination region 234, some of the radiation 232 (e.g., x-ray flux) produced by the radiation source 224 (e.g., an x-ray tube) may pass through the object 204 and be detected for subsequent processing.

While the object 204 is being conveyed through the upstream portion 233 of the examination region 234, radiation that traverses the object 204 may be detected by the first radiation detector 226 (e.g., a first x-ray detector). The first radiation detector 226 may produce data about the object as a function of the radiation it detects. This data may be transmitted to a controller (e.g., capable of processing the data) that is in operable communication with the first radiation detector 226. It will be understood in the art that a variety of detectors may be used in combination with the techniques disclosed herein. For example, the first radiation detector 226 may be a single row of sparse detectors. Additionally, existing detectors on an object scanning apparatus, such as scatter detectors, may be converted and used in combination with the techniques disclosed herein.

The controller receives the data produced by the first radiation detector 226 in coordination with a downstream motion of the object 204 relative to the first detector 226. The controller may use the received data to predict a radiation flux that will cause a desired amount of second radiation to be detected by the second radiation detector 228 in coordination with a downstream motion of the object relative to the second detector 228. The controller may dynamically adjust the x-ray flux emitted by the x-ray source as a function of the prediction (e.g., to achieve a desired image quality and/or reduce excessive radiation from being emitted). It will be appreciated that the term "dynamic" is used herein in a broad sense to comprise, among other things, an instantaneous change while the object 204 continues to move downstream in the examination region 234. In one embodiment, the controller uses algorithms to make a prediction, and control statements are used to adjust the radiation flux emitted by the radiation source 224. It will be appreciated that the radiation flux may be adjusted, for example, by adjusting the current being delivered to the radiation source 224.

The controller may be configured to increase the radiation flux emitted by the radiation source 234, for example, when the radiation (e.g., the number of radiation photons) detected by the first radiation detector 226 falls below a predetermined threshold. That is, when less than a desired amount of radiation is detected by the first radiation detector 226, the controller may cause the current applied to the x-ray source 224 to be increased, so that more radiation is emitted thereby and thus more radiation may traverse the object under examination. The controller may also be configured to decrease the radiation flux emitted by the radiation source 224 when the radiation detected by the first radiation detector 226 is above a predetermined threshold, thus causing less radiation to traverse the object under examination. It will be appreciated that the controller may also reduce (e.g., to substantially zero) the radiation flux emitted by the radiation source 224 when no object is conveyed through the examination region. It may be determined that no object is being conveyed through the examination region, for example, when radiation detected by the first radiation detector has remained substantially constant and high for a predetermined period of time, for example, or simply when the conveyer 222 is deactivated.

In one embodiment, for example, the controller adjusts the radiation flux as various pieces of luggage are being passed through the object scanning apparatus 202. As an example, the current going to the radiation source is initially 4 mA as a first piece of luggage (containing a (dense) metal box) enters the upstream portion 233 of the examination region 234 and radiation that has traversed the first piece of luggage is detected by the first radiation detector 226. The first radiation detector 226 transmits data about the radiation detected to the controller, and the controller determines that radiation flux emitted by the radiation source should be increased to some value based on the radiation that was incident on the first detector 226. Accordingly, in coordination with a downstream motion of the object 204 relative to the second detector 228, the controller adjusts the radiation flux (e.g., by causing the current going to the radiation source to be increased to 5.8 mA). A second x-ray flux is thus directed at the first piece of luggage in coordination with a downstream motion of the first piece of luggage relative to the second detector 228. As such, second x-rays that traverse the first piece of luggage are detected by the second radiation detector 228, and corresponding data may be output and used to generate an image of the first piece of luggage, where this image has a desirable quality (e.g., contrast).

While the first piece of luggage is in the downstream portion 235 of the examination region 234, a second piece of luggage (containing (less dense) clothes) may be in the upstream portion 233, for example, and the first radiation detector 226 may detect radiation that has traversed the second piece of luggage. Data from the first radiation detector 226 about the detected radiation may be communicated to the controller, and the controller may predict that the radiation flux should be reduced to some value. As the second piece of luggage is conveyed to the downstream portion of the examination region 234 (and the the first piece of luggage exits the examination region) the controller may downwardly adjust the radiation flux emitted by the radiation source (e.g., by adjusting the current delivered to the radiation source from 5.8 mA to 4.9 mA). Once the second piece of luggage (or a portion of the second piece of luggage) is in the downstream portion of the examination region, the radiation (corresponding to the 4.9 mA current) traverses the second piece of luggage and is detected by the second radiation detector 228, for example.

It will be appreciated that while the foregoing discussion was in the context of multiple pieces of luggage (e.g., first and second pieces of luggage), that the principles may also be applied to different portions of the same piece of luggage. For example, a first portion of a piece of luggage may initially be examined and the x-ray flux may be adjusted in coordination with a downstream motion of that first portion relative the second detector 228. The x-ray flux may subsequently be adjusted in coordination with a downstream motion of a second portion of the piece of luggage relative to the second detector 228. This may be very useful as pieces of luggage generally comprise multiple items that have differing densities.

It will be appreciated that it may be necessary to reverse the conveyor to rescan a piece of luggage. The rescan may be accomplished in two ways. In one embodiment, the conveyor is reversed until the piece of luggage to be rescanned is upstream of the first examination region. In another embodiment, the radiation flux may be associated with conveyor position and stored. During a rescan, the required radiation flux may be recalled based on the conveyor position at which the rescan is initiated.

It will be appreciated that the controller may also predict the density of an object 204 and/or an attenuation caused by the object using data from the radiation source 224 and the first radiation detector 226. The object's predicted density, for example, may then be used to determine the radiation flux that will be needed to cause a predetermined amount/range of radiation to be incident on the second radiation detector 228. In another embodiment, data from the radiation source 224 may be used to calculate the current going to the radiation source 224 using a mapping function and parameters from a calibration procedure, for example. This calculation, for example, may be useful if the radiation flux is adjusted by adjusting the current to the radiation source 224.

It will also be appreciated that limits may be placed on the ability of the controller to adjust the radiation flux. For example, the radiation flux may not be adjusted if an insufficient period of time has elapsed since the radiation flux was last adjusted. The controller's ability to adjust the radiation flux may also be limited as a function of the radiation source's specifications. For example, a radiation source may specify a range of rates at which radiation may be emitted and the controller may be limited to adjusting the radiation flux within that range.

Additionally, the controller may not adjust the radiation flux when the change would be less than or equal to some threshold. For example, if it is predicted by the controller that the radiation flux emitted by the radiation source should be increased slightly (e.g., corresponding to a +0.1 mA change in current) to detect a predetermined amount/range of radiation incident on the second radiation detector 228, the radiation flux may not be adjusted. This may be beneficial, for example, to limit excessive adjusts that may cause wear-and-tear on the radiation source and/or the controller.

It will be understood to those skilled in the art that a second radiation source (not shown) may also be included in the object scanning device 202. In one example, the radiation source 224 is used to emit radiation that is detected by the first radiation detector 226, and a second radiation source is used to emit radiation that is detected by the second radiation source 228. Having two radiation sources may simplify algorithms and control statements, for example, since the radiation source 224 (emitting radiation that is detected by the first radiation detector 226) may emit radiation at a constant rate.

It will also be appreciated that the direction of the x-rays may be adjusted (e.g., by a collimator) so that radiation is targeted to the first radiation detector 226 and/or the second radiation detector 228. For example, when the object 204 is in the upstream portion 233 of the examination region 234, the x-rays may be directed at the first x-ray detector 226, and when the object 204 is in the downstream portion 235, the x-rays may be directed at the downstream portion 235. In this way, the first 226 and second 228 detectors are not receiving radiation unnecessarily, for example.

Figure 3:
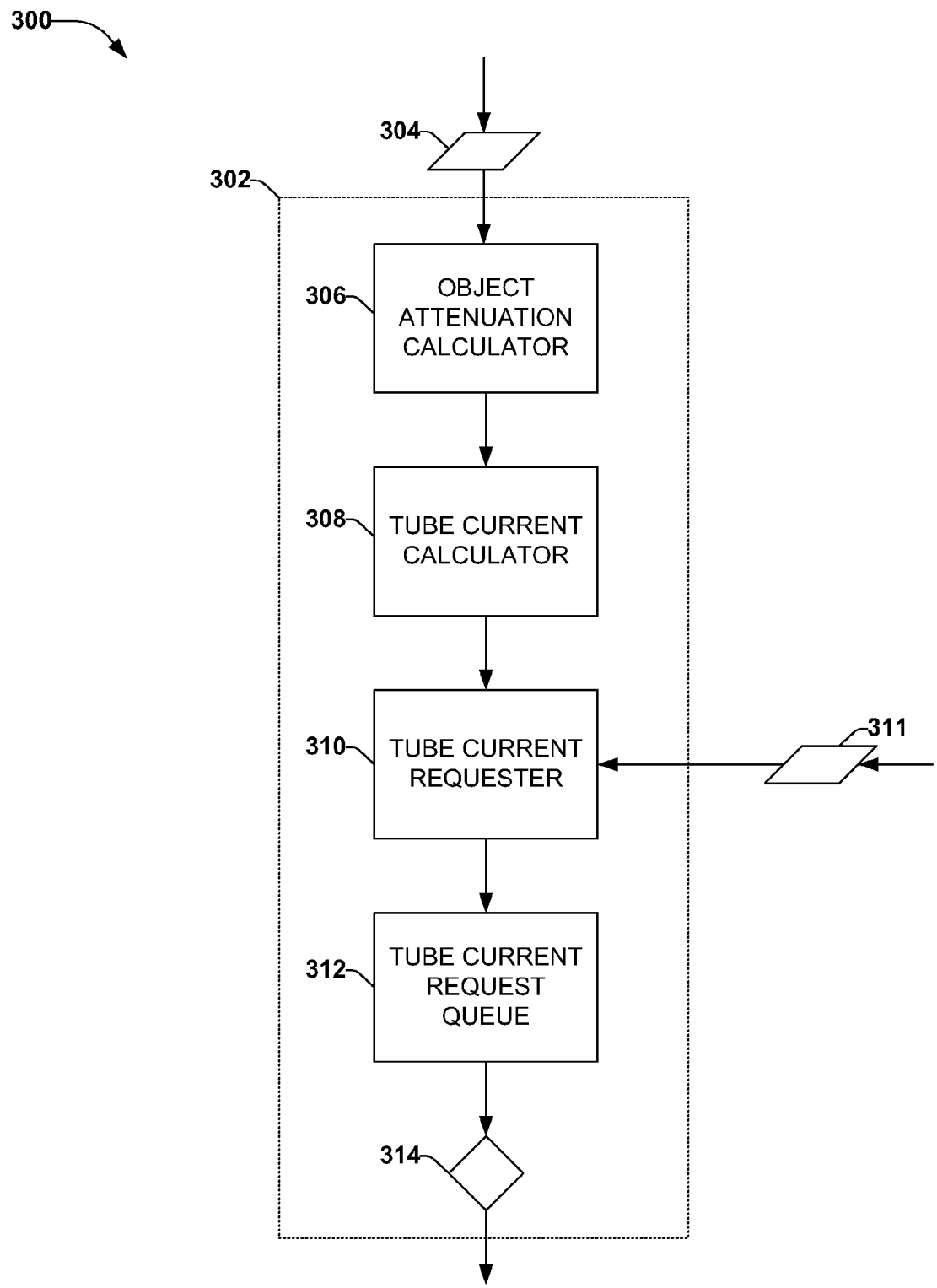
FIG. 3 is a schematic block diagram illustrating one or more components of a controller that is configured to adjust radiation flux as an object is moving from an upstream portion of an examination region to a downstream portion of the examination region.

FIG. 3 illustrates an exemplary environment 300 for a controller 302 (e.g., 116 in FIG. 1) configured to adjust a radiation source (e.g., 224 in FIG. 2) as a function of data received from a first radiation detector (e.g., 226 in FIG. 2) and/or the radiation source. It will be appreciated that other controllers, computations, and/or control statements may also be used to adjust the radiation flux. It will also be appreciated that additional components may be added to the controller 302 herein described and/or components may be removed from the controller 302.

The object attenuation calculator 306 receives data 304 (e.g., measurements) from the first radiation detector, as a function of radiation incident on the first radiation detector, and calculates an object's attenuation. In one example, an offset table may be subtracted from data 304 received by an object density calculator to generate offset-corrected measurements, a logarithm of the offset-corrected measurements may be computed and negated to generate log measurements, log measurements from a reference channel may be subtracted from the log measurements to generate reference-corrected measurements, the reference-corrected measurements may be added to an air table to generate air-corrected measurements, air-corrected measurements may be corrected for bad detectors to generate bad-detector corrected measurements; and the object's attenuation may be determined by low-pass filtering the bad-detector corrected measurements.

The object attenuation calculator 306 may output the attenuation of the object to a tube current calculator 308. The tube current calculator 308, for example, may calculate a tube current that would promote a predetermined amount of radiation to be detected by a second radiation detector after traversing the object.

Once the tube current calculator 308 calculates a tube current that would promote a predetermined output by a second radiation detector, a tube current requester 310 may use control statements, for example, to request that radiation flux emitted from the radiation source be adjusted if a set of conditions are met. It will be appreciated that the tube current requester 310 may also receive data about the current radiation flux 311 being emitted from the radiation source. This may assist in limiting requests, for example, to adjust the radiation flux. For example, the tube current requester 310 may not make a request if an insufficient period of time has elapsed since the radiation flux was last adjusted and/or the change in radiation flux would be less than or equal to some threshold.

The tube current requester 310 may send requests to adjust the radiation flux to a tube current request queue 312. In one embodiment, the tube current request queue 312 may compare a current request with a pending request to determine whether to send one and/or both requests to the radiation source. For example, if the current request is to increase the radiation flux and the pending request is to reduce the radiation flux, the tube current request queue 312 may disregard the pending request. This may, for example, limit how often the radiation flux is adjusted, for example.

The tube current request queue 312 may transmit requests to the radiation source (e.g., a high-voltage controller in a radiation source) wherein the radiation flux may be adjusted. It will be appreciated that the requests may pass through a tube load calculator 314 prior to being transmitted to the radiation source. The tube load calculator 314 may act as a safety check, for example, that verifies that the request is within the radiation source's capabilities.

Figure 4:
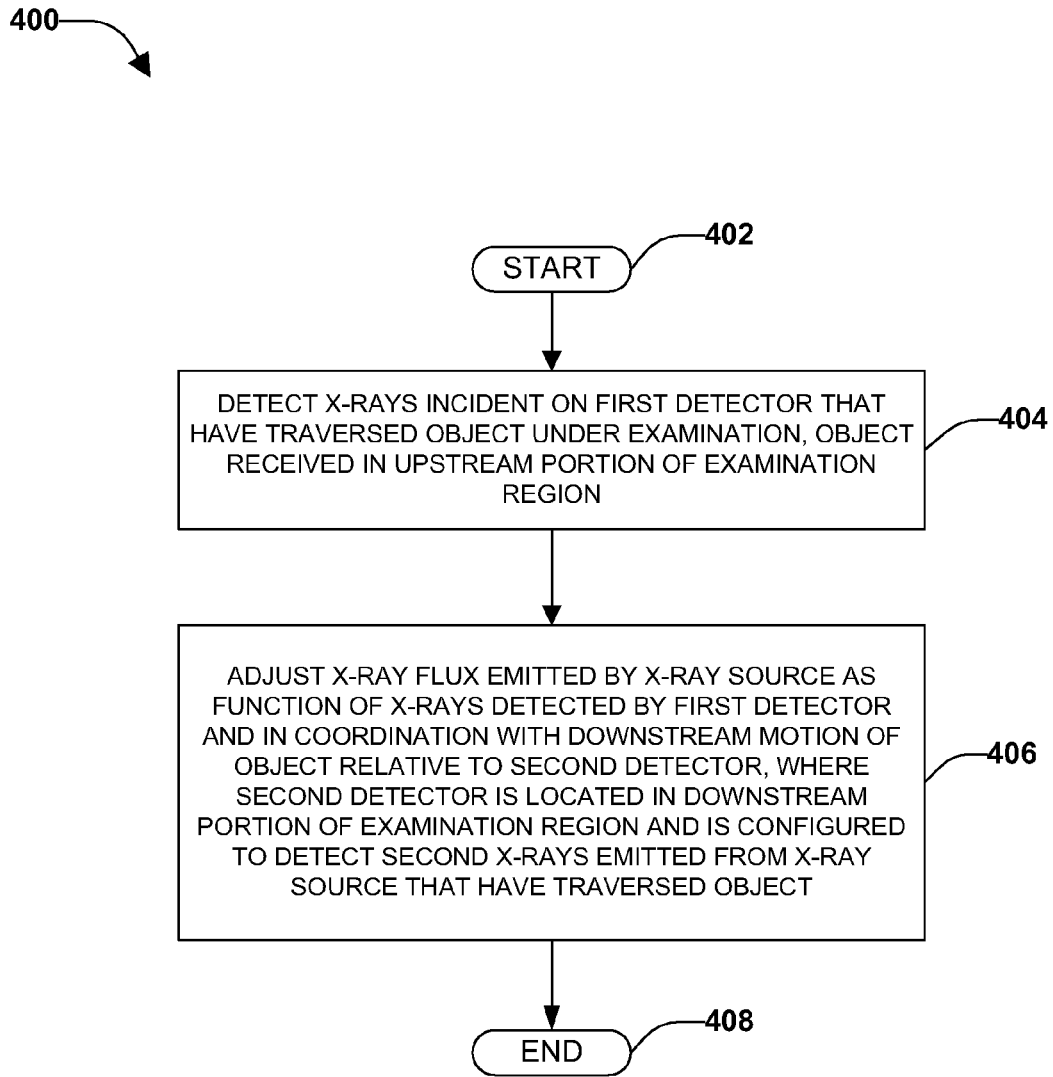
FIG. 4 is a flow diagram illustrating an example method for adjusting x-ray flux output by an x-ray source in a security scanning apparatus.

FIG. 4 illustrates an exemplary method 400 for adjusting x-ray flux output by an x-ray source in a security scanning apparatus. The method begins at 402, and x-rays incident on a first detector that have traversed an object under examination are detected at 404. The x-rays are detected in coordination with a downstream motion of the object, where the object is received in an upstream portion of an examination region and moves (e.g., is conveyed) to a downstream portion of the examination region. X-rays that are emitted from the x-ray source but do not traverse the object under examination are either absorbed by the object and/or are attenuated based on contact with the object (and unable to be detected).

At 406, the x-ray flux emitted by the x-ray source is adjusted as a function of the x-rays detected by the first detector in coordination with a downstream motion of the object relative to a second detector. The second detector is located in the downstream portion of the examination region and is configured to detect second x-rays emitted from the x-ray source that have traversed the object. For example, if less than some threshold of x-rays (e.g., x-ray photons) are detected by the first detector, the x-ray flux emitted by the x-ray source may be increased (so that more x-rays traverse the object and are detected by the second detector than were detected by the first detector). It will be appreciated that the x-flux may not be adjusted if an insufficient period of time has elapsed since the x-ray flux was last adjusted, if the change is insignificant, and/or if the change is impracticable (e.g., where the desired change is outside the radiation source's capabilities), etc.

The object may be conveyed from the upstream portion to the downstream portion of an examination region at a constant speed. If the object is conveyed at a constant speed, it may be easier to predict when to adjust the x-ray flux so that a desired amount of x-rays that have traversed the object are incident on the second detector (than it would be if the object is conveyed at a variable speed). Adjusting the x-ray flux too early or too late, for example, may cause more or less than a desired amount of x-rays to traverse the object and be detected by the second x-ray detector. It will be understood to those skilled in the art that if less than the desired amount of x-rays that have traversed the object are incident to the second detector, data output by the second detector may be less meaningful. The exemplary method 400 ends at 408.

It will be appreciated that the x-ray flux may be reduced (e.g., to substantially zero) when no object is being conveyed through the examination region. In one embodiment, the scanning apparatus determines that no object is being scanned when x-rays incident on the first x-ray detector remain constant and high for a predetermined period of time. Reducing the x-ray flux while objects are not being conveyed may reduce the wear on the x-ray source and/or reduce the energy being consumed by the security scanning apparatus, for example.

In one embodiment, data from the x-ray source is combined with data from the first detector to determine the density of the object in the examination region. Since there is an exponential relationship between the density of an object and the x-rays incident on a detector, an x-ray flux that will achieve a desired number of x-rays incident on a detector may be predicted, and the x-ray flux may be adjusted accordingly.

Figure 5:
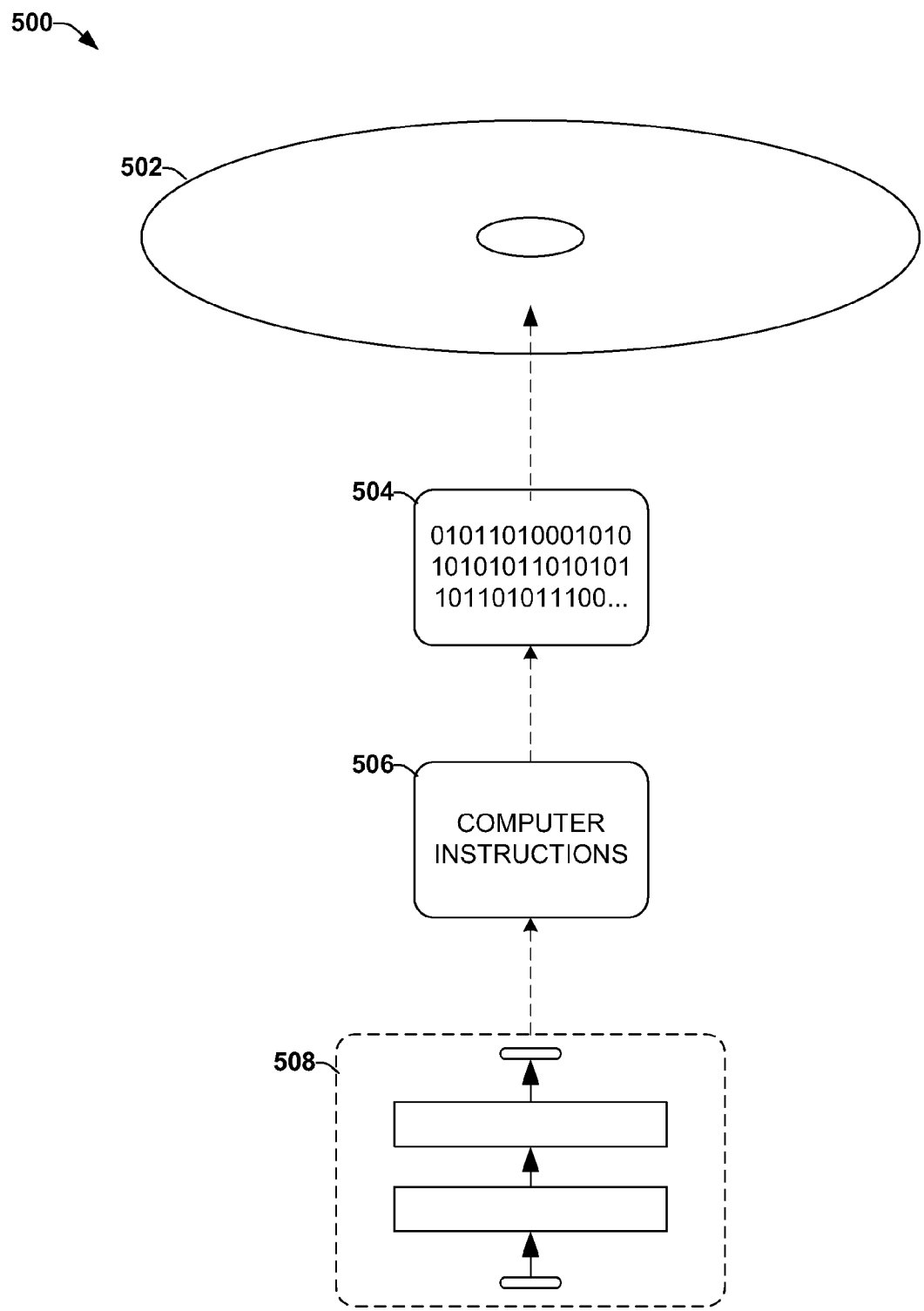
FIG. 5 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to one or more of the principles set forth herein. In one such embodiment 500, the processor-executable instructions 506 may be configured to perform a method, such as the exemplary method 400 of FIG. 4, for example. In another such embodiment, the processor-executable instructions 506 may be configured to implement a system, such as at least some of the exemplary system 200 of FIG. 2, for example. Many such computer-readable media may be devised by those of ordinary skill in the art that are configured to operate in accordance with the techniques presented herein.

What is claimed is:

1. A method for adjusting a flux rate of radiation x-rays emitted by an x-ray source of a scanning apparatus, comprising:
    detecting first x-rays, emitted by the x-ray source at a first flux rate and incident on a first x-ray detector, that have traversed a first portion of an object under examination to generate a first measurement;
    detecting second x-rays, emitted by the x-ray source at the first flux rate and incident on a second x-ray detector, that have traversed a second portion of the object to generate a second measurement, the second x-rays detected concurrently with the first x-rays;
    adjusting the flux rate of x-rays emitted by the x-ray source from the first flux rate to a second flux rate as a function of the first measurement and in coordination with a downstream motion of the object relative to the second x-ray detector; and
    detecting third x-rays, emitted by the x-ray source at the second flux rate and incident on the second x-ray detector, that have traversed the first portion of the object to generate a third measurement.

2. The method of claim 1, comprising reconstructing an image of the object based upon the second measurement but not the first measurement.

3. The method of claim 1, the adjusting comprising:
    increasing the flux rate of x rays emitted by the x-ray source when the first measurement indicates a decline in detected x-rays relative to a previous measurement yielded from the first x-ray detector, and
    decreasing the flux rate of x-rays emitted by the x-ray source when the first measurement indicates an increase in detected x-rays relative to the previous measurement.

4. The method of claim 1, comprising decreasing the flux rate of x-rays emitted by the x-ray source to substantially zero when a fourth measurement, yielded from the first x-ray detector, indicates that no object is being conveyed through the scanning apparatus.

5. The method of claim 1, the adjusting comprising adjusting the flux rate when:
    a specified period of time has elapsed since the flux rate was last adjusted; and
    a difference between the first flux rate and the second flux rate is greater than a specified threshold.

6. The method of claim 1, comprising maintaining a relative position between the x-ray source and the second x-ray detector during the examination of the object.

7. The method of claim 6, comprising maintaining a relative position between the x-ray source and the first x-ray detector during the examination.

8. The method of claim 1, comprising calculating an attenuation for the first portion of the object based upon the first measurement.

9. The method of claim 8, the calculating comprising:
    subtracting an offset table from the first measurement to generate an offset-corrected measurement;
    computing a logarithm of the offset-corrected measurement to generate a log measurement;
    subtracting a reference log measurement yielded from a reference channel of the first x-ray detector from the log measurement to generate a reference-corrected measurement;
    adding the reference-corrected measurement to an air table to generate an air-corrected measurement;
    correcting the air-corrected measurement for one or more bad detectors to generate a bad-detector corrected measurement; and
    filtering the bad-detector corrected measurement using a low-pass filter to determine the attenuation for the first portion of the object.

10. A non-transitory computer readable medium comprising instructions that when executed perform a method for adjusting a flux rate of x-rays emitted by an x-ray source of a scanning apparatus, the method comprising:
    detecting first x-rays, emitted by the x-ray source at a first flux rate and incident on a first x-ray detector, that have traversed a first portion of an object under examination to generate a first measurement;
    detecting second x-rays, emitted by the x-ray source at the first flux rate and incident on a second x-ray detector, that have traversed a second portion of the object to generate a second measurement, the second x-rays detected concurrently with the first x-rays;
    adjusting the flux rate of x-rays emitted by the x-ray source from the first flux rate to a second flux rate as a function of the first measurement and in coordination with a downstream motion of the object relative to the second x-ray detector; and
    detecting third x-rays, emitted by the x-ray source at the second flux rate and incident on the second x-ray detector, that have traversed the first portion of the object to generate a third measurement.

11. The non-transitory computer readable medium of claim 10, the method comprising reconstructing an image of the object based upon the second measurement but not the first measurement.

12. The non-transitory computer readable medium of claim 10, the adjusting comprising:
    increasing the flux rate of x-rays emitted by the x-ray source when the first measurement indicates a decline in detected x-rays relative to a previous measurement yielded from the first x-ray detector, and
    decreasing the flux rate of x-rays emitted by the x-ray source when the first measurement indicates an increase in detected x-rays relative to the previous measurement.

13. The non-transitory computer readable medium of claim 10, the method comprising decreasing the flux rate of x-rays emitted by the x-ray source to substantially zero when a fourth measurement, yielded from the first x-ray detector, indicates that no object is being conveyed through the scanning apparatus.

14. The non-transitory computer readable medium of claim 10, the adjusting comprising adjusting the flux rate when:
    a specified period of time has elapsed since the flux rate was last adjusted; and
    a difference between the first flux rate and the second flux rate is greater than a specified threshold.

15. The non-transitory computer readable medium of claim 10, the method comprising calculating an attenuation for the first portion of the object based upon the first measurement.

16. The non-transitory computer readable medium of claim 15, the calculating comprising:
    subtracting an offset table from the first measurement to generate an offset-corrected measurement;
    computing a logarithm of the offset-corrected measurement to generate a log measurement;
    subtracting a reference log measurement yielded from a reference channel of the first x-ray detector from the log measurement to generate a reference-corrected measurement;
    adding the reference-corrected measurement to an air table to generate an air-corrected measurement;
    correcting the air-corrected measurement for one or more bad detectors to generate a bad-detector corrected measurement; and
    filtering the bad-detector corrected measurement using a low-pass filter to determine the attenuation for the first portion of the object.

17. An x-ray scanning apparatus, comprising:
    an x-ray source configured to emit x-rays;
    a first x-ray detector for detecting first x-rays incident thereon and emitted by the x-ray source at a first flux rate, the first x-rays having traversed a first portion of an object under examination and the first x-ray detector configured to generate a first measurement based upon the first x-rays;
    a second x-ray detector for detecting second x-rays incident thereon and emitted by the x-ray source at the first flux rate, the second x-rays having traversed a second portion of the object and the second x-ray detector configured to generate a second measurement based upon the second x-rays, the second x-rays detected concurrently with the first x-rays; and
    a controller configured to adjust a flux rate of the x-rays emitted by the x-ray source from the first flux rate to a second flux rate as a function of the first measurement and in coordination with a downstream motion of the object relative to the second x-ray detector, wherein:
        the second x-ray detector detects third x-rays incident thereon and emitted by the x-ray source at the second flux rate responsive to the controller adjusting the flux rate, the third x-rays having traversed the first portion of the object and the second x-ray detector configured to generate a third measurement based upon the third x-rays.

18. The x-ray scanning apparatus of claim 17, the x-ray source configured to rotate about the object during the examination.

19. The x-ray scanning apparatus of claim 18, the second x-ray detector configured to rotate about the object during the examination, wherein a relative position between the x-ray source and the second x-ray detector is maintained during the examination.

20. The x-ray scanning apparatus of claim 18, the first x-ray detector configured to rotate about the object during the examination, wherein a relative position between the x-ray source and the first x-ray detector is maintained during the examination.

* * * * *